No. 776,305. PATENTED NOV. 29, 1904.
F. H. DELKER.
SHIFTING RAIL FASTENER FOR VEHICLE SEATS.
APPLICATION FILED MAY 6, 1904.
NO MODEL.
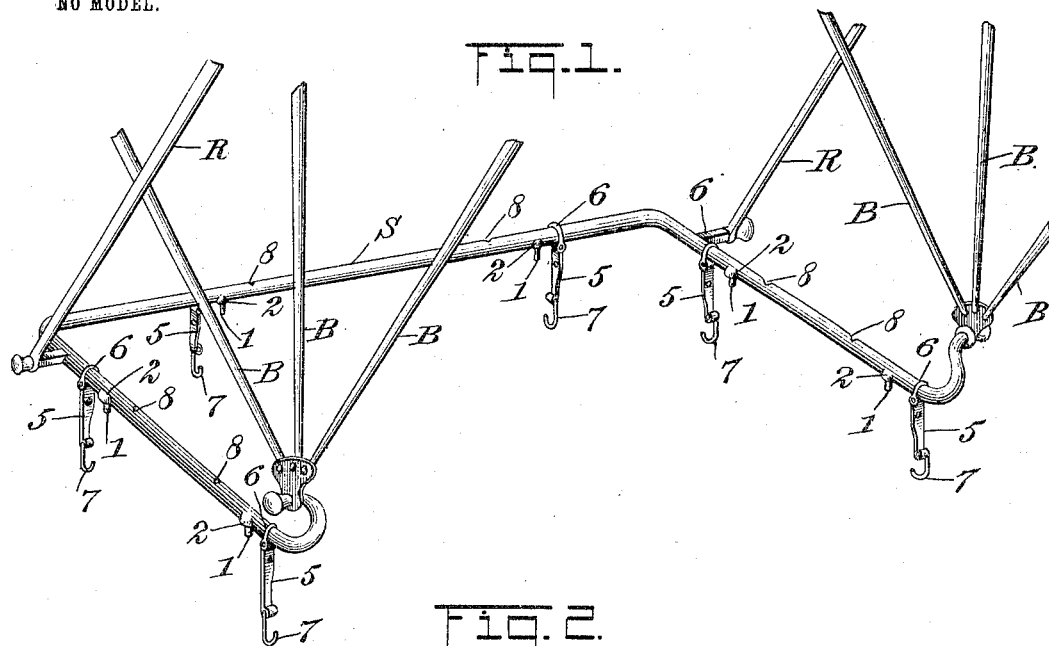
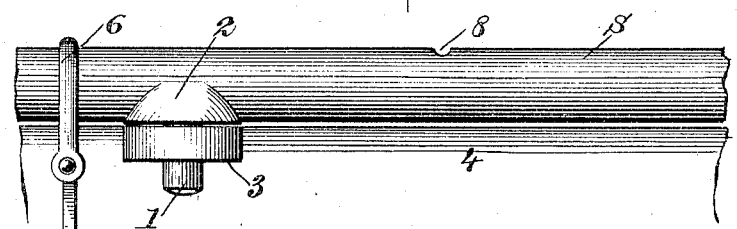
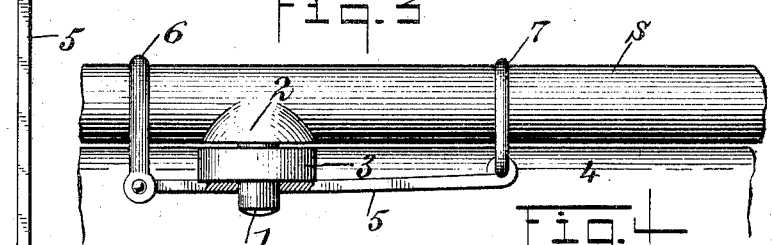
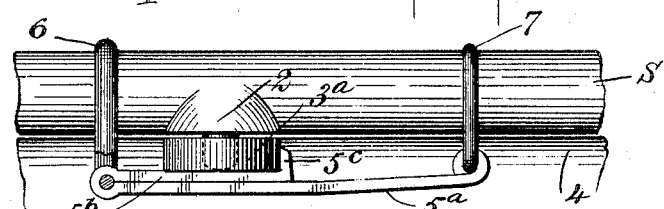
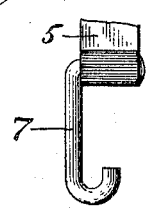
WITNESSES:
INVENTOR
Frank H. Delker
BY
ATTORNEYS No. 776,305.

Patented November 29, 1904.

UNITED STATES PATENT OFFICE.

FRANK H. DELKER, OF HENDERSON, KENTUCKY.

SHIFTING-RAIL FASTENER FOR VEHICLE-SEATS.

SPECIFICATION forming part of Letters Patent No. 776,305, dated November 29, 1904.

Application filed May 6, 1904. Serial No. 206,644. (No model.)

*To all whom it may concern:*

Be it known that I, FRANK H. DELKER, a citizen of the United States, and a resident of Henderson, in the county of Henderson and State of Kentucky, have invented a new and Improved Shifting-Rail Fastener for Vehicle-Seats, of which the following is a full, clear, and exact description.

This invention relates to improvements in shifting-rail fasteners for vehicle-seats; and it consists in certain improvements upon the fastener for which Letters Patent of the United States No. 731,287 were granted to me under date of June 16, 1903.

The present invention has for its principal object the provision of a simpler fastener than that disclosed in the above-mentioned Letters Patent and one which may be more cheaply constructed.

A further object of the invention is to provide a shifting-rail fastener which cannot be so easily accidentally disengaged and one which will operate satisfactorily without an aperture in the spring-leaf member to weaken it.

With the objects above stated and others in view, as will hereinafter appear, the invention consists in the novel fastener hereinafter described in two slightly-different forms and having the specific features of novelty clearly pointed out in the appended claims, it being understood that the proportions of the parts and their exact mode of assemblage may be varied within the scope of the appended claims without departing from the spirit of the invention.

Reference is to be had to the accompanying drawings, forming a part of this specification, in which similar characters of reference indicate corresponding parts in all the views.

Figure 1 is a perspective view of a shifting rail for a vehicle-seat provided with a plurality of fasteners constructed in accord with the present invention and having the bows of the vehicle-top and the brace-rod for the vehicle-top attached thereto in the usual manner. Fig. 2 is an elevational view of a portion of the shifting rail applied to a portion of the vehicle-seat rim in proper position relative to the seat-iron, but with the improved fastener in inoperative position. Fig. 3 is a view similar to Fig. 2, but showing the improved fastener in operative position. Fig. 4 is an elevational view of a shifting rail provided with pins for engagement with sockets in the seat-irons, the pins not extending below the lower surface of the seat-irons nor extending through the spring-leaf member, and showing a form of fastener especially adapted for such usage; and Fig. 5 is a detail view of the hook at the free end of the spring-leaf member, which serves to hold the spring-leaf member in operative position.

Referring to the drawings by reference characters, S designates the shifting rail, upon which the vehicle-top is supported by means of bows B and a folding brace-rod R of the usual type. The shifting rail is ordinarily provided at intervals with a plurality of downwardly-disposed pins or studs 1, which extend downward from laterally-projecting bosses 2 and are adapted to enter suitable sockets formed in seat-irons 3, mounted upon the rim 4 of the vehicle-seat.

The fastening devices employed to hold the pins 1 in engagement with the apertures formed in the seat-irons 3 consist, preferably, of a spring-leaf member 5, pivoted at one end in a loop 6, permanently secured upon the shifting rail adjacent to each of the bosses 2 and having at the free end thereof a hook 7, which is pivotally mounted in an eye at the end of the spring-leaf member, as shown. The spring-leaf members 5 are formed with an aperture to receive one of the pins or studs 1 when the fasteners are in operative position, as shown in Fig. 3, and the shifting rail is provided upon its upper surface at suitable points thereon with a plurality of notches 8 to receive the hooks 7 when brought into engagement with the rail.

When the shifting rail is provided with studs 1 and fasteners of the form just described, the adjustment of the shifting rail to the seat of the vehicle is accomplished by introducing the studs into the apertures in the corresponding seat-irons 3, then swinging the spring-leaf members 5 upward, so that the apertures in the said leaf members receive the studs 1 and permit the hooks 7 at the ends of said leaf members to be brought into engagement with the notches 8, formed therefor in the upper surface of the shifting rail. In order to bring the hooks 7 into operative position, it is necessary to spring the leaf members 5 slightly upward at their free ends, and for this purpose the leaf members 5 are made of spring-steel or other metal having the requisite degree of resiliency. After the hooks 7 have been brought into engagement with the notches 8 provided therefor the resiliency of the leaf members 5 holds the hooks in positive engagement with said notches, preventing any sliding movement of the hooks upon the shifting rail and making it practically impossible for the hooks to become accidentally disengaged from the shifting rail.

When the downwardly-projecting pins of the shifting rail do not pass below the lower surface of the seat-irons nor through the spring-leaf members, I make use of a fastener of the type illustrated in Fig. 4. In this form there is no aperture in the spring-leaf member. This form of fastener consists of a spring-leaf member 5$^a$, pivoted to a loop 6 of the form already described and provided at its free end with a hook 7 of the form above described. The spring-leaf member 5$^a$ differs from the spring-leaf member 5, however, in being provided at the end attached to the loop 6 with a reinforce 5$^b$, which is formed by extending the end of the leaf member which forms the eye for attachment to the loop 6 along the upper surface of the leaf member and turning the end of the reinforce 5$^b$ upward to present a lug 5$^c$ for engagement with the side of the seat-iron 3$^a$. So far as the engagement of this form of the fastener with the shifting rail is concerned its operation is precisely similar to that of the fastener first described; but the latter form of fastener engages differently with the seat-iron. As the spring-leaf members in the latter instance have not a positive interlocking engagement with the seat-irons, the lug 5$^c$ is formed at the end of the reinforce 5$^b$ of the spring-leaf member 5$^a$ for the purpose of holding the spring-leaf member to its place against the seat-iron.

As compared with the fastener disclosed in the Letters Patent above mentioned the fastener disclosed in this application and forming the present invention is considerably simpler in construction, is less expensive to manufacture, and holds with somewhat greater security when in use. The operation of the improved fastener in bringing it into operative position is not quite so easily effected; but the increased effort required to operate the improved fastener is so slight as to be of very little significance.

Having thus described my invention, I claim as new and desire to secure by Letters Patent—

1. The combination with a vehicle-seat iron, of a spring-leaf member loosely supported upon a shifting rail and adapted for engagement with the seat-iron, and a hook directly connected with said spring-leaf member and adapted for engagement with the shifting rail to hold the spring-leaf member in engagement with the seat-iron.

2. The combination with a seat-iron, of a spring-leaf member loosely supported on a shifting rail and adapted for engagement with the seat-iron, and a hook pivotally mounted in the free end of said spring-leaf member and adapted for engagement with the shifting rail.

3. The combination with a seat-iron, of a spring-leaf member loosely supported beneath a shifting rail and having an eye formed in the free end thereof, and a hook pivotally mounted in said eye and adapted for engagement with said shifting rail.

4. The combination with a seat-iron, of a spring-leaf member loosely supported on a shifting rail and having a reinforce provided on the spring-leaf member for engagement with the seat-iron, and means carried by the spring-leaf member to engage with the shifting rail and hold the reinforce in engagement with the seat-iron.

5. The combination with a seat-iron, of a spring-leaf member loosely supported by a shifting rail, said spring-leaf member having a reinforce adapted for contact with the under side of the seat-iron and provided with a lug for engagement with one side of the seat-iron, and means carried by the spring-leaf member for holding it in engagement with the seat-iron.

6. The combination with a seat-iron, of a spring-leaf member loosely supported by a shifting rail and having one end thereof bent back upon the spring-leaf member to form a reinforce therefor, the end of the reinforce being upturned to present a lug, and means carried by the spring-leaf member for holding the reinforce and the lug thereon in engagement with the seat-iron.

In testimony whereof I have signed my name to this specification in the presence of two subscribing witnesses.

FRANK H. DELKER.

Witnesses:
 FRANK J. EVANS,
 J. EDWARD EVANS.